April 12, 1927.
M. R. HULL
1,624,170
WINDSHIELD
Filed Oct. 21, 1925
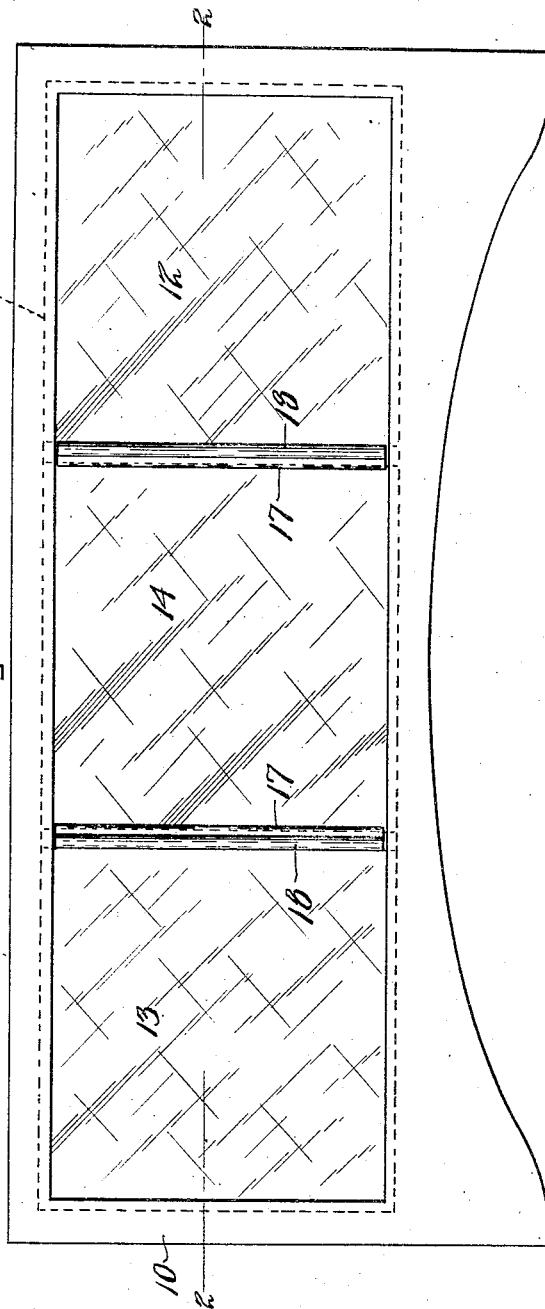
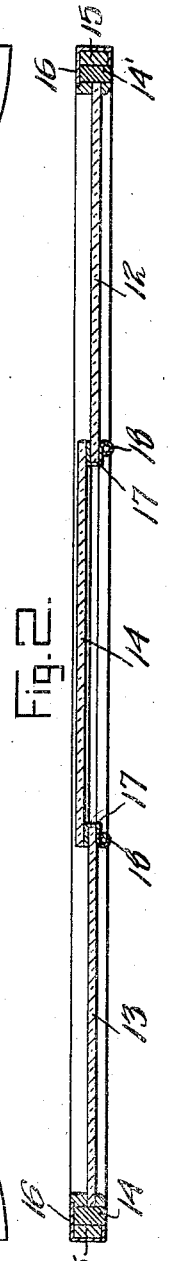
Inventor
Matthew R. Hull
By
Attorney Patented Apr. 12, 1927.

1,624,170

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION OF INDIANA.

WINDSHIELD.

Application filed October 21, 1925. Serial No. 63,987.

My said invention relates to a windshield for automobiles and it is an object of the same to provide convenient means for ventilating the interior and also to provide convenient means for affording a clear forward view for occupants of the car. This, as will be understood, is often of great importance to the driver, especially at night or in inclement weather. It will be understood that if only one of the windshield sections is open while all the windows and doors are closed very little draft will enter through the windshield opening by reason of the movement of the car and weather will be substantially excluded. For this purpose the windshield is provided with laterally slidable sections.

Referring to the accompanying drawings which are made a part hereof and on which similar reference characters indicate similar parts, Figure 1 is a rear elevation of the windshield, and Figure 2, a section on line 2—2 of Figure 1.

In the drawings reference character 10 indicates the frame of the windshield which may be of any conventional or desirable character and which has a circumferential notch or groove 11 in which the sections indicated at 12 and 13 may slide relatively to the stationary section 14.

Each of the sections 12 and 13 extends into the circumferential groove 11 at its outer edge and abuts against a strip 14' of wood or other suitable material which with a second strip 15 is held in place by a strip of sheet metal 16, U-shaped in cross section, it being understood that the details of the frame may be varied without departing from my invention. A strip of metal 17 is bent about the inner edge of the sections 12 and 13 to protect the same, said strip being also rolled on the inner side to provide a hand grip 18 which may be grasped by the occupants for sliding the corresponding sections back and forth whereby the windshield may be fully opened at either side or partially opened at both sides. The stationary section 14 is so positioned as to bear against the outer face of the strips 17 and form a dust and water-tight joint.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. A windshield for motor vehicles comprising a frame, a fixed section and a laterally slidable section in said frame, and a sheet metal strip bent over the free edge of said slidable section and forming a closure between the sections at one side of the shield and at its other side being rolled to form a longitudinal hand-grip, substantially as set forth.

2. A windshield comprising a frame having a rectangular opening with a groove in the inner edge of the frame about said opening, a fixed intermediate windshield section having its upper and lower extremities supported in the grooves at the upper and lower sides of the frame, a pair of side sections each normally supported on three sides in the frame, said side section being slidable into parallel relation with the intermediate section, a strip about the forward unsupported edge of each of said slidable sections adapted to protect the same and for closing the opening between the fixed and movable section, said strip having one edge rolled over to form a hand-grip, substantially as set forth.

In witness whereof, I have hereunto set my hand at Connersville, Indiana this 15th day of October, A. D. nineteen hundred and twenty-five.

MATTHEW R. HULL.